(12) United States Patent
Kourzanov

(10) Patent No.: US 9,867,215 B2
(45) Date of Patent: Jan. 9, 2018

(54) WIRELESS NETWORK AND METHOD

(71) Applicant: NXP B.V., Eindhoven (NL)

(72) Inventor: Petr Kourzanov, Eindhoven (NL)

(73) Assignee: NXP B.V., Eindhoven (NL)

( * ) Notice: Subject to any disclaimer, the term of this patent is extended or adjusted under 35 U.S.C. 154(b) by 24 days.

(21) Appl. No.: 14/702,916

(22) Filed: May 4, 2015

(65) Prior Publication Data

US 2015/0351130 A1 Dec. 3, 2015

(30) Foreign Application Priority Data

May 29, 2014 (EP) ..................................... 14170468

(51) Int. Cl.
*H04W 74/08* (2009.01)

(52) U.S. Cl.
CPC .... *H04W 74/0816* (2013.01); *H04W 74/0825* (2013.01)

(58) Field of Classification Search
CPC ......... H04W 74/0816; H04W 74/0808; H04W 74/0825; H04W 72/00; H04W 72/12
USPC ................... 370/329, 252, 394, 328
See application file for complete search history.

(56) References Cited

U.S. PATENT DOCUMENTS

| | | | |
|---|---|---|---|
| 5,661,727 A | 8/1997 | Kermani et al. | |
| 7,616,585 B1* | 11/2009 | Kritov | H04L 47/10 370/231 |
| 2006/0028984 A1 | 2/2006 | Wu et al. | |
| 2006/0268887 A1* | 11/2006 | Lu | H04L 47/10 370/394 |
| 2007/0115907 A1 | 5/2007 | Myles et al. | |
| 2010/0118727 A1* | 5/2010 | Draves, Jr. | H04L 45/02 370/252 |
| 2010/0232291 A1 | 9/2010 | Hirota et al. | |
| 2011/0013571 A1 | 1/2011 | Sawal | |

(Continued)

FOREIGN PATENT DOCUMENTS

| | | |
|---|---|---|
| CN | 101635654 A | 1/2010 |
| EP | 1 764 961 A1 | 3/2007 |

(Continued)

OTHER PUBLICATIONS

Extended European Search Report for application No. 14180342.9 (dated Oct. 13, 2015).

(Continued)

*Primary Examiner* — Kwang B Yao
*Assistant Examiner* — Syed M Bokhari

(57) ABSTRACT

A network node for a wireless network and corresponding methods for reducing collisions in a wireless network, a wireless network, a wireless sensor network and a smart building including a wireless sensor network. The network node includes a processor, memory and an antenna. The network node is operable in a promiscuous mode to: receive at least one acknowledgement, wherein each acknowledgement is an acknowledgement of a respective transmission sent by another node through the wireless network; determine, from the at least one acknowledgement, timing information relating to the timing of the respective transmission(s) sent by the other node; and use the timing information to schedule transmissions sent by the node to reduce the probability of collisions of with transmissions sent by the other node.

20 Claims, 4 Drawing Sheets

(56) References Cited

U.S. PATENT DOCUMENTS

| | | | |
|---|---|---|---|
| 2012/0196636 A1* | 8/2012 | Pratt, Jr. | G01D 21/00 |
| | | | 455/509 |
| 2013/0051323 A1* | 2/2013 | Song | H04W 28/044 |
| | | | 370/328 |
| 2013/0188513 A1 | 7/2013 | Vasseur et al. | |
| 2015/0117383 A1* | 4/2015 | Liu | H04L 1/1685 |
| | | | 370/329 |

FOREIGN PATENT DOCUMENTS

| | | |
|---|---|---|
| GB | 2 412 273 A | 9/2005 |
| JP | 2004173146 A | 6/2004 |
| WO | WO-2010/096031 A1 | 8/2010 |

OTHER PUBLICATIONS

Gafur, M Abdul et al; "An Enhanced Virtual Carrier Mechanism for MANET With Multi Rate Traffic Subdomains"; 2013 Fourth Int'l Conf. on computing, Communications and Networking Technologies; 5 pages (Jul. 1, 2013).

Mangold, Stefan et al; "The Evolution of Wireless LANs and PANs: Analysis of IEEE 802.11E for QoS Support in Wireless LANs"; IEEE Personal Communications, vol. 10, No. 6, USA; pp. 40-50 (Dec. 1, 2003).

IEEE Standard; "Specification 802.15.4: Wireless Medium Access Control (MA) and Physical Layer (PHY) Specifications for Low-Rate Wireless Personal Area Networks (LR-WPANs)—2003"; IEEE, New York, NY, US; 679 pages (2003).

ZigBee Alliance; "ZigBee Specification"; San Ramon, CA, US; 622 pages(Sep. 2012).

IEEE Standard; "Part 15.4: Low-Rate Wireless Personal Areas Networks (LR_WPANs), Amendment 1: MAC sublayer"; IEEE, New York, NY, US; 225 pages (Apr. 16, 2012).

Office Action from U.S. Appl. No. 14/702,998; 35 pages (dated Feb. 9, 2017).

Final Office Action dated May 18, 2017 for U.S. Appl. No. 14/702,998, 21 pages.

Non-Final Office Action; U.S. Appl. No. 14/702,998; 27 pages (Sep. 14, 2017).

* cited by examiner

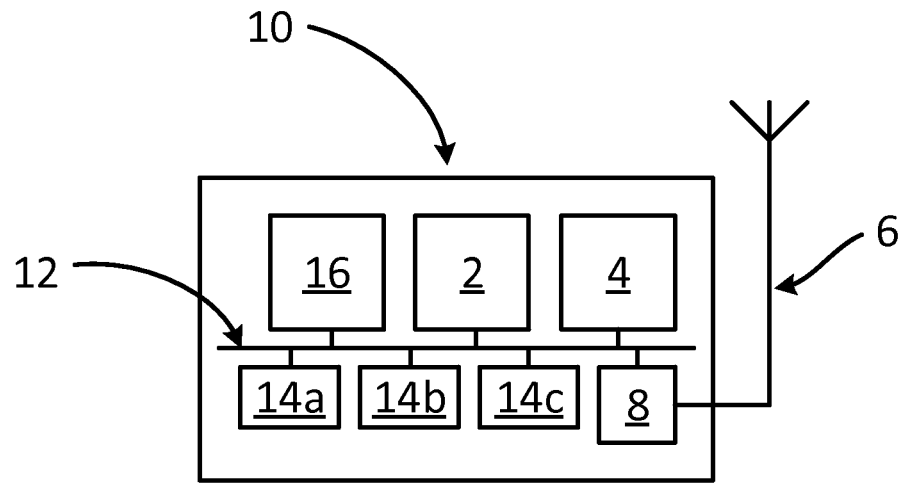
Figure 1
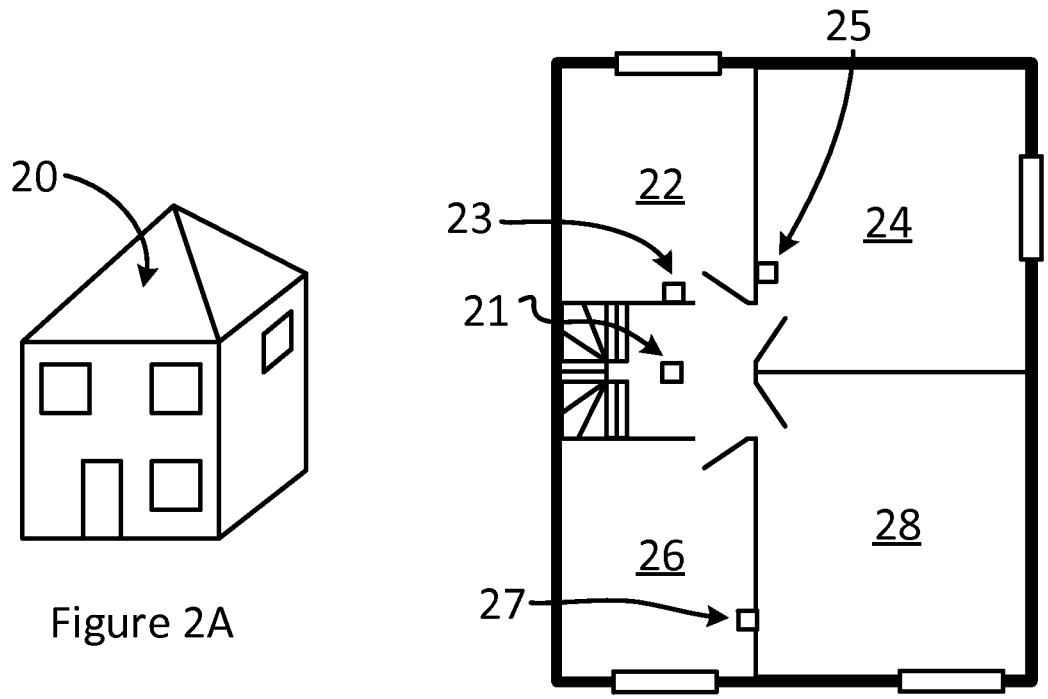
Figure 2A
Figure 2B

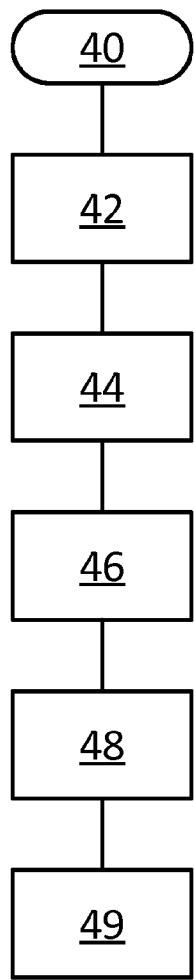
Figure 4
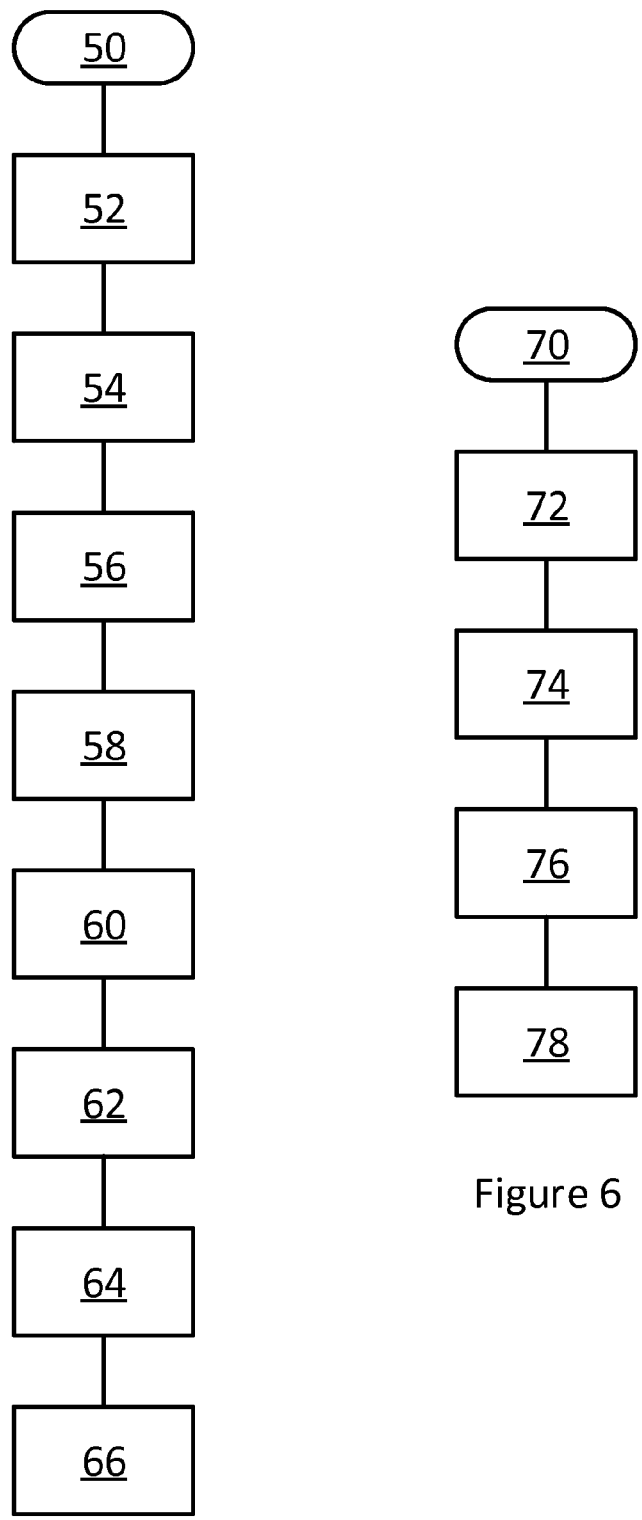
Figure 6
Figure 5

WIRELESS NETWORK AND METHOD

CROSS-REFERENCE TO RELATED APPLICATIONS

This application claims the priority under 35 U.S.C. § 119 of European patent application no. 14170468.4, filed on May 29, 2014, the contents of which are incorporated by reference herein.

FIELD OF THE INVENTION

This invention relates to a wireless network and method.

BACKGROUND OF THE INVENTION

CSMA/CA (Carrier Sense Multiple Access with Collision Avoidance) is a well-known media access control (MAC) protocol used in networks having a shared carrier medium (e.g. wireless local area networks (WLANs)). Under this protocol, nodes in the network sense the transmissions made by other nodes over the shared carrier medium and defer their own transmissions until the network becomes idle. In some examples, each node may wait for a random period of time, either before (in the case of IEEE 802.15.4) or after (in the case of IEEE 802.11) a clear channel assessment (CCA), so as to reduce the probability of two or more nodes, sensing that the network has become idle, beginning to transmit at the same time, causing a collision.

In a wireless network, it may often be the case that nodes are unable to sense transmissions made by other nodes. This may be because the nodes are not within range of each other's transmissions, or because of interference or shielding of transmissions caused by the environment (e.g. building) in which the nodes are located.

The hidden node problem (HNP) describes a situation in which transmitter nodes in a network are each visible to a receiver node, but in which the transmitter nodes are not visible to each other. Under the HNP a first transmitter node, sensing no activity on the network, may begin a transmission while the receiver node is already receiving a transmission from another transmitter node that is hidden from the first transmitter node. This causes a collision at the receiver node. The carrier sense method under CSMA can therefore fail to avoid collisions under this scenario.

The exposed node problem (ENP) describes a situation in which the transmissions of two transmitter nodes are visible to each other, but in which the receivers of those transmissions are not in range of each other. This can give rise to false collisions at the transmitter nodes, since the CSMA protocol will prevent them from making simultaneous transmissions to their respective receiver nodes, even though this would not in fact lead to a collision at the receiver nodes. The ENP can often arise in networks using the dense tree topology, in which the spatial distribution of the nodes is not correlated with the communication patterns in the network. For example, it may be that the transmitter nodes, although physically located close to each other, may be unrelated routers that serve different branches of the network tree (they have different parent nodes). In some cases, the transmitter nodes, although operating under the same communication standard (e.g. IEEE 802.15.4), may not even belong to the same network.

An example of a Collision Avoidance (CA) protocol that is used with CSMA/CA employs a handshake procedure prior to data transmission in which RTS (Request to Send) and CTS (Clear to Send) messages are exchanged by a transmitter node and the intended receiver node in order to establish that the receiver node is available and ready.

The use of RTS and CTS messages can alleviate the HNP, since the receiver node only sends a CTS message to one transmitter node at a time. Therefore, a transmitter node must wait until it is sent a CTS message from the receiver node before it begins its own transmission, even though it may sense no activity over the carrier medium. Transmitter nodes that are hidden from each other rely on the CTS messages to prevent collisions involving their transmissions at the receiver node.

The use of RTS and CTS messages can also alleviate the ENP. When a first transmitter node hears an RTS message from a neighbouring second transmitter node, but does not then hear a CTS message from the receiver node to which the RTS message was sent, the first transmitter node can deduce that it is an exposed node. Based on this, the first transmitter can then make transmissions to another receiver node in the knowledge that they will not cause collisions at the receiver node to which the initial RTS message was sent.

Although RTS and CTS messages can reduce the occurrence of collisions in a wireless network, they lead to additional congestion in the network and are generally enabled only for large frame sizes. The use of RTS and CTS messages is therefore made optional in the IEEE 802.11 standard.

In some wireless networks, especially those having relatively small maximum transfer unit (MTU) sizes, the additional overhead imposed by the use of RTS/CTS messages may not warrant their use. For instance, the IEEE 802.15.4 standard defines a MTU of 127 bytes. This is especially the case in crowded networks including a large number of densely spaced nodes.

The IEEE 802.15.4 standard specifies the physical layer and MAC layer for low rate wireless personal networks (WPANs). The ZigBee standard is based on IEEE 802.15.4-2003 version and was developed for use in low rate, low power, secure applications. These standards are suitable for use in wireless sensor networks (WSNs) in the home and building automation domain (Smart Buildings). The use of RTS and CTS messages may be too onerous for these kinds of networks, in which low power usage is a requirement. Further, the small MTU sizes in WSN applications may not justify using RTS/CTS messages. This is especially true in the context of the internet of things (IoT), in which the network is anticipated to be extremely crowded with a huge number of nodes.

SUMMARY OF THE INVENTION

Aspects of the invention are set out in the accompanying independent and dependent claims. Combinations of features from the dependent claims may be combined with features of the independent claims as appropriate and not merely as explicitly set out in the claims.

According to an aspect of the invention, there is provided a network node for a wireless network, the network node comprising:
  a processor;
  memory; and
  an antenna,
  wherein the network node is operable in a promiscuous mode to:
    receive at least one acknowledgement, wherein each acknowledgement is an acknowledgement of a respective transmission sent by another node through the wireless network;

determine, from the at least one acknowledgement, timing information relating to the timing of the transmission(s) sent by the other node; and use the timing information to schedule transmissions sent by the node to reduce the probability of collisions of with transmissions sent by the other node.

According to another aspect of the invention, there is provided a method for reducing collisions in a wireless network, the method comprising a network node operating in a promiscuous mode to:

receive at least one acknowledgement, wherein each acknowledgement is an acknowledgement of a respective transmission sent by another node through the wireless network;

determine, from the at least one acknowledgement, timing information relating to the timing of the transmission(s) sent by the other node; and use the timing information to schedule transmissions sent by the node to reduce the probability of collisions of with transmissions sent by the other node.

By acting in a promiscuous mode to receive acknowledgement(s) of transmission(s) sent by another node in the network and to determine timing information from the acknowledgement(s), the network node can schedule its transmissions for reducing the probability of collisions. In accordance with embodiments of this invention, network nodes may therefore schedule their transmissions using timing information contained in acknowledgements sent over the network and/or based on the timing of the acknowledgements themselves. This may alleviate collisions caused by, for example, the HNP in a manner that need not explicitly employ RTS and CTS messages. Network traffic and overheads may therefore be reduced compared to networks employing RTS and CTS messages.

Each acknowledgement may be provided in the form of an acknowledgement frame. The acknowledgement frame may be a standard compliant acknowledgement frame, whereby a method according to an embodiment of this invention may be compatible with standards such as IEEE 802.11, IEEE 802.15, IEEE 802.15.4, IEEE 802.15.4e and ZigBee.

The network node may determine the timing information based on the time of receipt of the acknowledgement(s). For example, by assuming that acknowledgement of a transmission in the network is usually sent a predetermined or predictable amount of time after the transmission was originally sent, the time at which the transmission was originally sent can be inferred from the time at which the acknowledgement was received by the network node. In this way, the network node can determine the timing information relating to the timing of the transmission(s) sent by the other node even though it may not itself have received those transmission(s) (e.g. where the network node and the other network node are hidden nodes).

The network node may be operable to determine the timing information by inspecting timing information contained in the at least one acknowledgement. For example, the acknowledgement(s) may include a time stamp indicating the time at which the transmission to which the acknowledgement(s) correspond was sent by the other node. The timing information may also include transmission sequence numbers to allow the transmission to which the acknowledgement relates and/or the transmitting node to be identified.

In another example, it is envisaged that the acknowledgement may include timing information relating to more than one transmission sent by the other node. In a further example, the acknowledgement may include timing information relating to one or more transmissions made by multiple other nodes. By determining the timing information relating to more than one transmission, the network node can schedule its own transmissions to reduce the probability of collisions more effectively.

The timing information may be included in an extension element of the acknowledgement. The extension element may be a standard compliant (e.g. compliant with IEEE 802.15.4e) Information Element (IE) extension of an acknowledgement frame.

It is noted that in some embodiments, a combination of the approaches noted above for determining the timing information relating to the timing of the transmission(s) sent by the other node or nodes may be used. In particular, both the time of receipt of the acknowledgement(s) and content of the acknowledgement(s) may be used to determine the timing information.

In some examples, the network node can determine the timing information relating to the timing of transmissions sent by a plurality of other nodes. The timing information may be used to schedule transmissions sent by the node to reduce the probability of collisions of with transmissions sent by the plurality of other nodes. This may be implemented using any of the approaches noted above for determining the timing information. For example, the time of receipt of multiple acknowledgements can be used to infer the time of sending of multiple transmissions by one or more other nodes. In another example, as noted above, the content of the acknowledgments may be inspected for determining the timing information. For instance, the content may include a schedule indicating the timing of a plurality of transmissions sent by one or more other nodes. The schedule may include a plurality of time stamps.

According to a further aspect of the invention, there is provided a network node for a wireless network, the network node comprising:

a processor;

memory; and an antenna, wherein the network node is operable to:

determine one or more collisions of transmissions sent to the node by a first other network node and a second other network node; and in response to said determination, include timing information in one or more acknowledgements sent to the first and second other network nodes for use by the first and second other network nodes to schedule their transmissions with respect to each other to avoid further collisions.

According to another aspect of the invention, there is provided a method for reducing collisions in a wireless network, the method comprising a network node:

determining one or more collisions of transmissions sent to the node by a first other network node and a second other network node; and in response to said determination, including timing information in one or more acknowledgements sent to the first and second other network nodes for use by the first and second other network nodes to schedule their transmissions with respect to each other to avoid further collisions.

When a network node determines that a collision has occurred, it can respond by including timing information in one or more acknowledgements sent to the network nodes that sent the transmissions that caused the collision. Those nodes may then use the timing information to schedule their transmissions with respect to each other to avoid further collisions. In some examples, the network nodes may use the timing information in the manner described above in order to schedule their transmissions.

The network node may be operable to use a negative acknowledgement to resend the timing information. For example, the negative acknowledgement can be used on determination of a further collision of transmissions sent to the network node by the first and second other network nodes. This can alleviate problems relating to non-receipt of the acknowledgement by either of the first and second other network nodes (e.g. because either node was inactive at the time the acknowledgement was sent or because of a collision at either node of the acknowledgement with another message) whereby one or both of the other nodes omits to schedule its transmissions to avoid further collisions.

The timing information may include a list of transmissions sent by the first and second other nodes. The timing information may also include the times (e.g. using time stamps) at which the transmissions were sent by the first and second other nodes.

According to a further aspect of the invention, there is provided a wireless network comprising a plurality of nodes of the kind described above. The wireless network may include a plurality of hidden nodes.

According to another aspect of the invention, there is provided a wireless sensor network comprising a wireless network of the kind described above in which at least some of the network nodes include one or more environmental sensors.

According to a further aspect of the invention, there is provided a smart building comprising a wireless sensor network of the kind described above.

The wireless network nodes, wireless network and corresponding methods disclosed herein may be compliant with standards such as IEEE 802.11, IEEE 802.15, IEEE 802.15.4, IEEE 802.15.4e and ZigBee. It is envisaged that embodiments of this invention may comply with the 2.4 Ghz version of the IEEE 802.15.4 specification, or indeed with versions operating in other frequency bands.

BRIEF DESCRIPTION OF THE DRAWINGS

Embodiments of the present invention will be described hereinafter, by way of example only, with reference to the accompanying drawings in which like reference signs relate to like elements and in which:

FIG. 1 shows a node for a wireless network in accordance with an embodiment of the invention;

FIG. 2A shows a smart building in accordance with an embodiment of the invention;

FIG. 2B shows an interior space of the smart building of FIG. 2A in accordance with an embodiment of the invention;

FIGS. 4 to 6 each show a method according to an embodiment of the invention.

DETAILED DESCRIPTION

Figure 3:
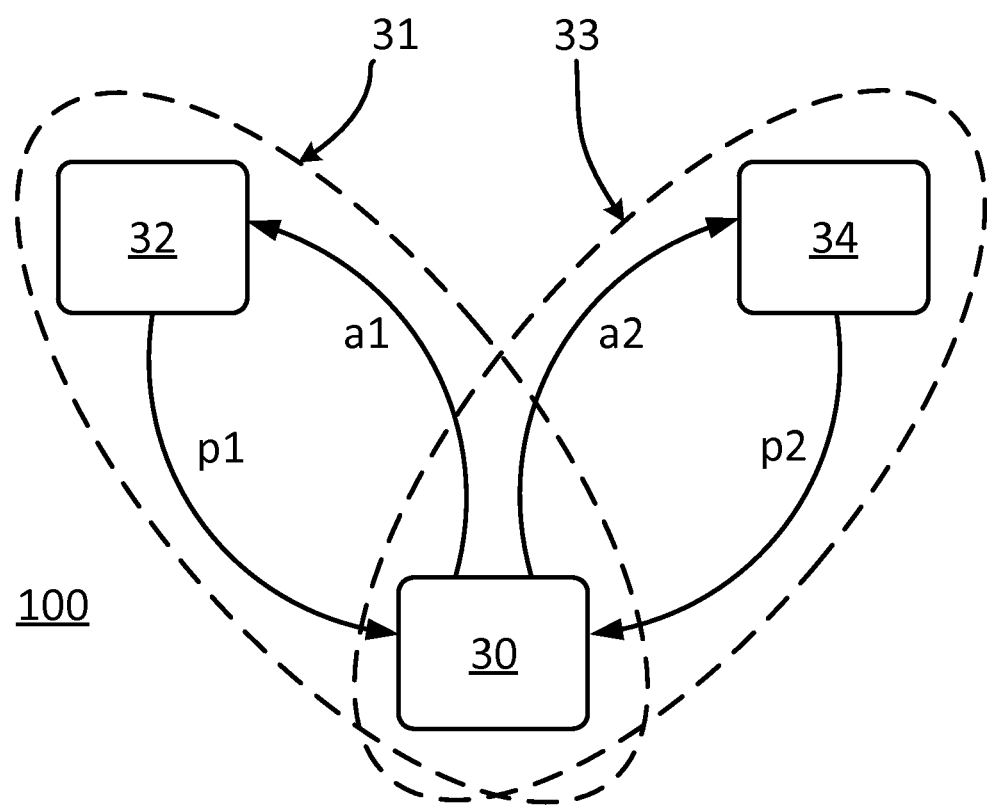
FIG. 3 shows a wireless network including a plurality of nodes in accordance with an embodiment of the invention.

Embodiments of the present invention are described in the following with reference to the accompanying drawings.

FIG. 1 shows a node 10 for a wireless network in accordance with an embodiment of the invention. The node 10 includes an antenna 6 for transmitting and receiving messages over the network. The node 10 may include an interface 8 including radio frequency components connected to the antenna 6 for processing incoming and outgoing signals. The node 10 can also include a processor 4 for processing data and controlling the operation of the node 10. The node 10 may further include a memory 2 for storing data.

The node 10 may also include one or more environmental sensors 14a, 14b, 14c for use in a wireless sensor network (WSN). The WSN may be provided for use in the home and building automation domain (e.g. in a Smart Building). The environmental sensors may include sensors for measuring temperature, light, humidity, gas composition and/or other environmental conditions.

The node 10 may be associated with objects such as light switches, power switches, heating controls or other features that are typically integrated in an automated building. The node 10 may include I/O circuitry 16 for local connection to these features. For example, the node 10 may serve to identify whether a light switch or heater is currently in an on or an off state. The node 10 can interconnect with features of the switch, heater, etc. through the I/O circuitry 16 to make this determination.

The various components of the node 10 may be connected together via a bus 12.

FIG. 2A shows a smart building 20 that includes a WSN in accordance with an embodiment of the invention. The building 20 may, for example, be a residential building such as a house of a block of apartments. In other examples, the smart building 20 may be an office, warehouse, public building, green house or other kind of building.

The WSN includes network nodes having environment sensors as described above. For instance, FIG. 2B illustrates an interior space of the building 20 including a number of rooms 22, 24, 26, 28. The rooms 22, 24, 26 are provided with network nodes 23, 25 and 27 which communicate wirelessly via a router node 21. The network nodes 23, 25 in this example are incorporated into light switches in rooms 22 and 24, respectively and signal a building automation system (BAS) when the lights switches are operated by sending a message to the BAS through the router 21. Similarly, the network node 27 in room 26 is connected to a heater. When the heater is operated, the network node 27 signals this to the BAS via the node 21. The network nodes in the building 20 can also receive messages from the BAS via the router 21. The BAS can, in this way, remotely control the light switches, heaters of other devices with which the network nodes are associated.

The interior space is an example of an environment that may give rise to the HNP. For instance, node 25 and node 27 shown in FIG. 2B may be hidden from each other because they are out of range of each other's transmissions and/or the walls separating the room 24 and the 26 interfere with their transmissions such that they cannot reach the other node. Although node 25 and node 27 may be hidden from each other, the router 21 may be located such that it can itself receive transmissions from both. Simultaneous transmissions by nodes 25 and 27 may, according to the HNP, cause collisions at the router 21.

Although the wireless network described above is provided in the context of a smart building, it will be appreciated that embodiments of this invention are generally applicable to network nodes for wireless networks.

FIG. 3 illustrates a wireless network 100 including a plurality of nodes 30, 32, 34. In this example, node 30 is assumed to be a receiver node and nodes 32 and 34 are assumed to be transmitter nodes.

The nodes 30, 32, 34 may be nodes of the kind described above in relation to FIG. 1. The wireless network 100 may be a network of this kind described above in relation to FIGS. 2A and 2B. For instance, the node 30 may correspond to the router 21 shown in FIG. 2B, and the nodes 32 and 34 may correspond to the nodes 25 and 27 shown in FIG. 2B.

It will be appreciated that in a wireless network, a node may at any given moment be either a receiver node or a transmitter node according whether it is sending or receiving transmissions. For the present example, it is assumed that node 30 is currently receiving transmissions from nodes 32 and 34. Node 30 may for instance be a router node, operable to route transmissions between nodes 32 and 34. It will further be appreciated that the wireless network may include many more nodes than are shown in the present, simplified example.

In FIG. 3, nodes 32 and 34 are hidden nodes in the sense that although both node 32 and node 34 are able to send/receive transmissions to/from node 30, node 32 is not able directly to receive ("hear") transmissions sent by node 34 and node 34 is not able directly to hear transmissions sent by node 32. This is shown in FIG. 3 by the dashed lines 31 and 33, which schematically illustrate the ranges of the transmitters 32 and 34, respectively. Transmissions sent by hidden nodes 32 and 34 may give rise to collisions at node 30 in accordance with the HNP.

FIG. 4 illustrates a number of steps associated with a method according to an embodiment of the invention. The method of FIG. 4 starts at step 40, in which the network node 30 may be in an idle state awaiting receipt of a transmission.

In step 42, the network node 30 receives a first transmission p1 from network node 32 and second transmission p2 from network node 34. In this example, p1 and p2 are received at the same time, which causes a collision of p1 and p2 at the network node 30. As explained above, network node 32 and network node 34 are unable to hear each other's transmissions and therefore CSMA alone is unable to prevent simultaneous or near simultaneous transmission of p1 and p2 by network nodes 32 and 34, respectively.

At step 44, the network node 30 determines that a collision of the transmissions p1 and p2 has occurred. In accordance with an embodiment of this invention, the network node 30 may react to the determination that a collision has occurred by altering the acknowledgement messages that it sends. For example, in method step 46 of FIG. 4, the network node 30 can make a determination to alter the content of subsequent acknowledgements sent to the network node 32 and the network node 34 to include timing information. These acknowledgements including the timing information can be sent in step 48. The timing information can be used by the network node 32 and the network node 34 to schedule their future transmissions to reduce the probability that collisions associated with their respective future transmissions will occur.

In one example, the acknowledgement that includes the timing information can comprise a collision packet. This collision packet may be broadcast to all nodes in the network 100 that are within range of the node 30, particularly where the collision of transmissions p1 and p2 has wiped out information in p1 and p2 (e.g. a node ID or a sequence number in the headers of p1 and p2) that would otherwise enable the node 30 to identify the nodes which sent the packets p1 and p2. The broadcasting of a collision node including timing information relating to, for example, p1 and p2 can allow any nodes (e.g. nodes 32 and 34) receiving the collision packet to schedule their future transmissions to avoid future collisions associated with the HNP.

In another example, where the collision of p1 and p2 did not wipe out information in p1 and p2 (e.g. a node ID or a sequence number in the headers of p1 and p2) that would enable the node 30 to identify the nodes 32 and 34 as the senders of p1 and p2, the acknowledgements that include the timing information can comprise negative acknowledgements sent to node 32 and node 34. The negative acknowledgements can indicate that p1 and p2 were not correctly received and can further including the timing information available to the node 30 at that point.

In a further example, the timing information may be included in acknowledgements sent by node 30 to acknowledge subsequent transmissions made by node 32, node 34 or another node in the network 100. For instance, where subsequent transmissions (p3, p4, p5 . . . ) are received at the node 30, corresponding acknowledgements (a3, a4, a5 . . . ) may include the timing information available to the node 30 at that point.

It is envisaged that the approaches set out above for including the timing information in one or more acknowledgements (i.e. the use of collision packets, NAKs and/or ACKs to subsequent transmissions), are not mutually exclusive and may be used in combination.

The timing information sent by the network node 30 can, for example, include information relating to the timing of transmissions such as p1 and p2 (or further transmissions) sent by the network node 32 and the network node 34. In one example, the timing information could be included in an Information Element of an acknowledgement frame.

The timing information can take a number of different forms. In one example, the timing information includes a list of one or more transmission IDs (e.g. transmission sequence numbers) corresponding to transmissions sent by network node 32 and/or network node 34. The list can further include one or more time stamps, each time stamp associated with an entry in the list of transmissions IDs corresponding to transmissions sent by the network node 32 or the network node 34, thereby to indicate the time at which those transmissions were sent. As will be explained in more detail below in relation to, for example, FIG. 7, timing information of this kind can be used by the network node 32 and/or the network node 34 to schedule their future transmissions to avoid future collisions associated with the HNP.

In this example, the network node 30 is operable to modify its behaviour to include timing information in acknowledgements sent to the network node 32 and network node 34 in response to the determination that a collision of transmissions from those network nodes has occurred. Alternatively, in some examples, it is envisaged that the network node 30 can, as a matter of routine, include timing information of this kind in the acknowledgements that it sends, irrespective of whether or not a collision has been determined. In the case where timing information is included in acknowledgements (and/or negative acknowledgments as explained below in relation to step 49) only after collisions have been determined however, the network node 30 can avoid the increase in packet size associated with including the timing information in the acknowledgements.

In some examples, it will be appreciated that the wireless network 100 may include a greater number of nodes than those shown in FIG. 3. For example, more than two hidden nodes may be included in the network. In such cases, the timing information included by the network node 30 in the acknowledgement messages that it sends may relate to transmissions sent by any number of network nodes that may or may not be hidden from each other. The timing information in some examples may comprise an identification code (e.g. a node ID) or a sequence number identifying the network node from which the associated transmission has been received and an accompanying time stamp as noted above. In this way, a network node receiving an acknowledgement containing timing information is able to discern, for each transmission sent over the network, the transmitting node concerned and the time at which the transmission was sent.

In step 49 of the method shown in FIG. 4, the network node 30 may respond to a subsequent determination of one or more further collisions of transmissions sent by the network nodes 32 and 34 by resending the timing information to the network nodes 32 and 34. In particular, this resending of the timing information may be implemented using a negative acknowledgement (NAK) message containing the timing information. This approach can be used to alleviate a problem associated with either network node 32 or network node 34 not receiving the above-mentioned acknowledgement including the timing information and omitting to schedule its subsequent transmissions to avoid collisions. Thus, the network node 30 may be operable to assume that determination of further collisions of transmissions sent by these nodes is indicative that either node was not able to receive the acknowledgement containing the timing information as noted above because, for example, it may have been inoperable at the time that the acknowledgement was sent by the network node 30 or it may itself have been in transmission mode at that time and unable to receive any messages. The negative acknowledgement (NAK) message may be sent once again if further collisions are subsequently determined.

FIG. 5 illustrates another method according to an embodiment of the invention. The method starts in step 50 at which point it is assumed that timing information has been received by the network nodes 32 and 34 and they have each scheduled their subsequent transmissions in order to avoid future collisions. The manner in which the rescheduling takes place will described in more detail below in relation to, for example, FIG. 7.

In step 52, network node 32 sends transmission p1 to network node 30 (again referring to FIG. 3). Network node 32 is able to send transmission p1 in the knowledge that it will not cause a collision with transmissions sent by network node 34, because the timing information that it has received allows it to determine time slots within which network node 34 will not, or is unlikely to, send any transmissions.

In step 54 of FIG. 5, transmission p1 is received by network node 30. In step 56 of FIG. 5, network node 30 sends acknowledgement a1 to network node 32 to acknowledge receipt of transmission p1. In this example, acknowledgement a1 includes timing information. The timing information may include information relating to the timing of transmissions sent by either network node 32 and/or network node 34. In some examples, the timing information can relate to a time window containing recent transmissions sent by these network nodes. The size of the window may be determined in accordance with design requirements and, for example, to comply with the standard under which the wireless network 100 operates. The window may be determined as a certain period of time (for example, one second, two seconds, three seconds . . . ), or may alternatively be indicative of a previous N transmissions sent by the network nodes 32 and 34, where N can again be chosen in accordance with the design requirements or for compliance with a standard. In some embodiments, the size of the window, either in terms of the time period it covers or in terms of the number of transmissions included within the window, may be tuned automatically. This tuning may be guided by the level of collisions that are determined within the network 100.

In step 58 of FIG. 5, acknowledgement a1 is received by network node 32. Network node 32 is thereby able to determine that its transmission p1 was correctly received by network node 30. Network node 32 may also inspect timing information included in the acknowledgement a1, thereby to aid it in scheduling its future transmissions. In this respect, it is noted that each network node may update the scheduling of its transmissions based on the most recent information received in acknowledgment messages sent over the network. Based on this most recent information, the network node 32 can determine whether or not it needs to reschedule its future transmissions or whether the current scheduling is sufficient for avoiding collisions.

In step 58 of FIG. 5, network node 34, which is able to hear transmissions sent by network node 30 is also in receipt of acknowledgement a1. Although acknowledgement a1 is not addressed to network node 34, as explained in more detail below, network node 34 can act promiscuously to receive and process acknowledgements that are associated with transmissions sent by other nodes in the network (in the present example, node 32) and to use timing information contained within the acknowledgement to schedule its future transmissions as described herein. Network node 34 can, as described above in relation to network node 32, therefore also make a determination as to whether its future transmissions need to be rescheduled on the basis of the timing information contained in acknowledgement a1. If it determines that the current scheduling is sufficient for avoiding collisions, then it need not reschedule its future transmissions. On the other hand, if the timing information in acknowledgement a1 is indicative that rescheduling of future transmissions by network node 34 is required, then network node 34 may reschedule its transmissions as appropriate.

In step 60, network node 34 subsequently sends a transmission p2 to network node 30. Because network node 34 has scheduled or rescheduled transmission p2 in order to avoid collisions, it may assume that at the time of transmission of p2, network node 32 will not simultaneously transmit a further transmission. Accordingly, network node 34 can assume that a collision of transmission p2 with transmissions sent by network node 32 will not occur, or is unlikely to occur.

In step 62 of FIG. 5, network node 30 receives transmission p2.

In step 64, network node 30 sends acknowledgement a2 to network node 34 to confirm that it has received transmission p2. The acknowledgement a2 may include timing information of the kind described herein. The acknowledge a2 may include more up-to-date timing information than that which was contained in acknowledgement a1.

In step 66 of FIG. 5, network node 34 receives acknowledgement a2 and is thereby made aware that transmission p2 was correctly received by network node 30. Network node 34 may also inspect timing information contained in acknowledgement a2 and again make a determination as to whether future transmissions sent by the node 34 need to be rescheduled.

Similarly, network node 32 in this example acts promiscuously and receives and processes acknowledgement a2, which was addressed to network node 34. Network node 32 may determine timing information from the acknowledgement a2 and again, determine whether its future transmissions require rescheduling based on this latest information.

In the method relating to FIG. 5, it was assumed that in step 50, the network node 30 had already switched to operating in a mode in which it includes timing information in acknowledgements sent over the network. As noted above, it is alternatively envisaged that the network node 30 may always include timing information in all acknowledgements sent over the network (irrespective of whether collisions have been determined).

It will be appreciated that the method of FIG. 5 can be implemented to allow network nodes such as nodes 32 and 34 to collect and process timing information concerning transmissions sent by other nodes in the network in order to schedule or reschedule its own subsequent transmissions to prevent collisions with transmissions sent by those other nodes.

The steps of another method in accordance with an embodiment of this invention are schematically illustrated in FIG. 6. The method of FIG. 6 may be implemented by a node such as network node 32 or network node 34 of the kind shown in FIG. 3. The method starts at step 70 in which it is assumed that the network node is in an idle state.

The network node is operable in a promiscuous mode to monitor the network for acknowledgements sent over the network that acknowledge transmissions sent by other network nodes. In step 82 of FIG. 6, the network node receives an acknowledgement. The acknowledgement is an acknowledgement of a transmission sent by another network node. For instance, the node implementing the method of FIG. 6 may be the node 34 shown in FIG. 3, and the acknowledgement may be an acknowledgement sent by node 30 to node 32 to acknowledge a transmission sent by node 32 to node 30. As in FIG. 3, the other network node may be a network node that is hidden from the network node. Conventionally, the network node may ignore the acknowledgment, noting that it is not addressed to itself but is instead addressed to the other network node that sent the transmission to which the acknowledgment relates. In accordance with the present embodiment however, the network node processes the acknowledgement as follows.

In step 74 the network node determines timing information from the acknowledgement. As noted above, this may be achieved by inspecting timing information that is contained in the acknowledgement itself. Thus, for example, the network node can inspect the content of the acknowledgement which may for example be a standard compliant acknowledgment frame. The network node may extract timing information including a list of one or more transmissions sent by one or more other network nodes and the times at which those transmissions were sent, for example, as indicated by time stamps contained in the list.

In an alternative method, the network node may determine the timing of the transmission with which the acknowledgement is associated based on the time at which the acknowledgement itself is received. Typically, acknowledgements are sent at a predictable time after the original transmission to which the acknowledgement relates was sent. In some examples, the time delay between sending of the original transmission and the sending of the acknowledgement to which the transmission relates may be a fixed period defined in accordance with the network standard. In other examples, the timing of the acknowledgement may be predictable to within a certain degree of certainty, whereby the network node may only be able to use the timing of receipt of the acknowledgement to determine the timing of the original transmission to within a given level of accuracy.

Factors such as the packet size and maximal wait time for an acknowledgement (e.g. these are 4.2 milliseconds and 192 microseconds, respectively, for the IEEE 802.15.4 standard) may be taken into account when determining the timing of a transmission based on the time at which the acknowledgement is received.

In this alternative method, the acknowledgements themselves need not include timing information as such, whereby the overhead associated with the transmission of those acknowledgements may be reduced. Indeed, the acknowledgements themselves in this example may be conventional acknowledgements. The network node may nevertheless inspect the content of the acknowledgement, for example, to determine which network node was responsible for sending the original transmission by extracting an identification code (e.g. node ID) of the transmitting network node from the acknowledgement.

In step 76 of FIG. 6, the network node uses the timing information, determined based on either the content of the acknowledgement and/or the time of receipt of the acknowledgement, to determine whether or not it should reschedule its future transmissions. This will be explained in more detail below in relation to FIG. 7. In some examples, it may determine that a rescheduling of its transmissions is not necessary. However, where it determines that the timing of the transmission to which the acknowledgement received in step 72 and/or other transmissions of which it is aware mean that future transmissions by other nodes are likely to cause a collision with its own transmissions, it can reschedule its own transmissions to avoid such collisions.

In step 78 of FIG. 6, the network node is operable to transmit one or more messages, which may be transmitted according to an updated schedule as noted above. These messages can be transmitted by the network node in the knowledge that the likelihood of there being a collision with transmissions made by other nodes in the network has been reduced.

It will be appreciated that the methodology described above in relation to FIG. 6 can be repeated on an ongoing basis, whereby the network node can continually update its knowledge of the timing of transmissions sent by other nodes in the network and can continually determine whether or not rescheduling of its own transmissions is appropriate for avoiding collisions.

It will further be appreciated that the network node may base its scheduling on the receipt of more than one acknowledgment. For example, the network node may receive acknowledgements that acknowledge transmissions sent by multiple other nodes and may use timing information contained within each of those acknowledgements (or inferred from their time of receipt as noted above) to schedule its own future transmissions.

Figure 7:
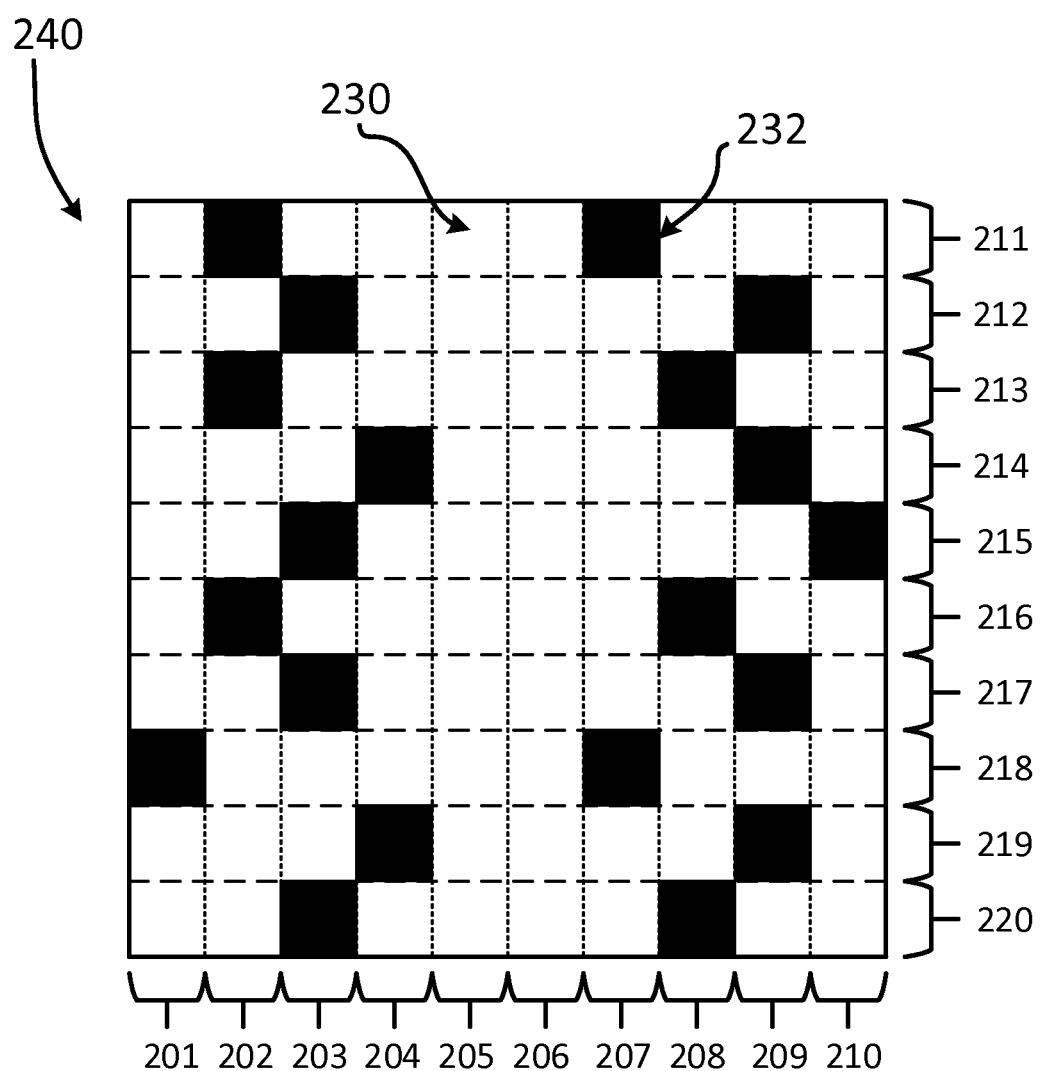
FIG. 7 shows an example of timing information for use in determining a de-synchronisation operation in accordance with an embodiment of the invention.

FIG. 7 illustrates an example of how timing information can be used by each network node in order to schedule its own future transmissions to reduce collisions.

As noted above, the timing information used by network node can be derived, for example, from timing information received in acknowledgements and/or timing information determined on the basis of the time of arrival of those acknowledgements. The network node can maintain its own record of transmissions sent over the network using this timing information. The network node can update its record of the transmissions that have been sent each time new timing information is made available to it. For example, the network node may update its timing information based on new information relating to new transmissions sent by other nodes in the network as specified in a most recently received acknowledgement. The record of the timing information can be maintained by the network node in a memory such as memory 2 described above in relation to FIG. 1. As also described above in relation to FIG. 1, a network node 10 can include a processor 4. In such examples, the processor 4 can process the timing information and perform the implementation of the scheduling of future transmissions as described below.

In FIG. 7, a record 240 including a plurality of time slots 230 is shown. In this example, the time slots can be configured in accordance with the communication protocol used by the wireless network. For example, the size of each time slot 230 can be determined according to the minimum transmission period used by the network or some multiple thereof. The use of smaller time slots increases the granularity of the record 240 kept by the network node but can increase processing and storage overheads associated with the record 240. On the other hand, large time slots used by the record 240 may decrease the accuracy of the scheduling for reducing collisions but can reduce the processing and memory storage overhead associated with the record 240. In one example, the time slot size may be derived from a standard with which the wireless network complies. For example, the time slot size may be given by the airtime of a maximal packet, which is defined by the IEEE 802.15.4 standard as 4.2 milliseconds.

The time slots 230 in the record 240 may be arranged in a plurality of slices 211-220. The slices each include a plurality of time slots 201 to 210. The record 240 in this example includes ten slices, each slice including ten time slots 230. Accordingly, in this example, the record 240 maintained by the network node of transmissions sent by other network nodes comprises transmissions sent over the preceding 100 time slots. It is envisaged that a greater or smaller number of slices may be used for the record 240, and that each slice may be arranged to include a greater or smaller number of time slots.

In FIG. 7, it is shown that some of the time slots 230 included transmissions (these are indicated by the shaded time slots 232). These transmissions 232 in the record 240 are determined by the network node using methodology of the kind noted above and added to the record 240 on an ongoing basis in order to maintain the record 240 for determining free time slots for future transmissions.

In the present example, it is shown that previous transmissions have been determined for each time slot within at least one of the slices 211-220 of the record 240 with the exception of time slots 205 and 206, which were free of transmissions within each slice in the record 240. Accordingly, the network node can determine from inspection of its record 240, that it is unlikely that a transmission sent within time slots 205 or 206 will lead to a collision at the receiver.

In some examples, the determination as to the best time slot for future transmissions by the network node may be probabilistic. For example, the network node may not be able to identify any time slots that, over the history window covered by the record 240, have been completely free of transmissions. In situations such as this, the network node may be operable to determine a best available time slot for transmission, which would be least likely to cause a collision. In some cases, it may be that there are no completely free time slots, whereby the network node may be operable to determine a best time slot on the basis of the time slots that have been least used recently according to the record 240 that the network node maintains. For example, after time slots 205 and 206, the next best time slots for sending a transmission with a reduced chance of there being a collision would be either time slot 201 or time slot 210, in which there has been only a single transmission in each case over the preceding ten slices.

As noted above, the record 240 maintained by a network node may be updated on a dynamic basis, whereby knowledge of transmissions sent during the history window of the record 240 is updated continually, thereby to provide each network node, at any given time, with information for determining a best future time slot for subsequent transmissions to reduce collisions.

In accordance with an embodiment of the invention, each node in a wireless network can maintain a record of transmissions sent by other nodes in the network. In some examples, each network node may maintain a record of the kind illustrated and described above in relation to FIG. 7. Note that the record for each network node may be different, since the network node need not include its own previous transmissions in the record.

It is furthermore noted that the record need not only include timing information relating to transmissions determined from acknowledgements received by the network node. In some cases, a network node may be hidden from only a subset of other transmitting network nodes in the network, in which case the network node may be operable directly to receive a certain number of transmissions sent by other network nodes, where those transmissions are not intended for the network node itself. In those cases, the network node may be operable to maintain its record to keep a note of those directly received transmissions, whether or not it receives acknowledgements to those transmissions including timing information of the kind noted above. In this way, a record comprising a combination of timing information from directly received transmissions and timing information based on acknowledgements received by the network node to transmissions sent by other network nodes can be used.

Accordingly, there has been described a network node for a wireless network and corresponding methods for reducing collisions in a wireless network, a wireless network, a wireless sensor network and a smart building including a wireless sensor network. The network node includes a processor, memory and an antenna. The network node is operable in a promiscuous mode to: receive at least one acknowledgement, wherein each acknowledgement is an acknowledgement of a respective transmission sent by another node through the wireless network; determine, from the at least one acknowledgement, timing information relating to the timing of the respective transmission(s) sent by the other node; and use the timing information to schedule transmissions sent by the node to reduce the probability of collisions of with transmissions sent by the other node. The network node may also be operable to determine one or more collisions of transmissions sent to the node by a first other network node and a second other network node; and in response to said determination, include timing information in one or more acknowledgements sent to the first and second other network nodes for use by the first and second other network nodes to schedule their transmissions with respect to each other to avoid further collisions.

Although particular embodiments of the invention have been described, it will be appreciated that many modifications/additions and/or substitutions may be made within the scope of the claimed invention.

The invention claimed is:

1. A network node for a wireless network, the network node comprising: a processor; memory; and an antenna, wherein the network node is operable in a promiscuous mode to: receive, from a first other network node, an acknowledgement of a transmission sent by a second other node to the first other network node through the wireless network, wherein the acknowledgement includes timing information based on a collision of transmissions sent by the network node and the second other node to the first other network node; save, in a memory, a record of the acknowledgement of the transmission; determine, by a processor from the record, a time for transmission data that is unlikely to lead to a collision; calculate, by the processor, a probability of collisions for the transmission of a slot available that is unlikely to lead to a collision; determine, by the processor from the record, the timing information relating to the timing of first transmissions sent by the second other network node; and use the timing information to schedule transmissions sent by the network node to reduce the probability of collisions of with transmissions sent by the second other network node.

2. The network node of claim 1, wherein the network node is operable to determine the timing information by:
 determining a time at which each of the acknowledgement is received by the network node; and
 inferring the time at which the respective transmission to which the acknowledgement corresponds was sent by the second other network node.

3. The network node of claim 1, wherein the network node is operable to determine the timing information by inspecting timing information contained in the acknowledgement.

4. The network node of claim 1, wherein the timing information in the acknowledgement includes a time stamp indicating the time at which the transmission to which the acknowledgement corresponds was sent by the second other network node.

5. The network node of claim 1, wherein the network node is operable to:
 determine timing information relating to the timing of transmissions sent by a plurality of other nodes; and
 use the timing information to schedule transmissions sent by the node to reduce the probability of collisions of with transmissions sent by the plurality of other nodes.

6. The network node of claim 1, wherein the timing information comprises a schedule indicating the timing of a plurality of transmissions sent by the other node.

7. A wireless network comprising a plurality of nodes according to claim 1.

8. The wireless network of claim 7, including a plurality of hidden nodes.

9. A wireless sensor network comprising the network of claim 7, wherein at least some of the network nodes include one or more environmental sensors.

10. A smart building comprising the wireless sensor network of claim 9.

11. A network node for a wireless network, the network node comprising: a processor; memory; and an antenna, wherein the network node is operable to: determine one or more collisions of transmissions sent to the node by a first other network node and a second other network node; and in response to said determination, include timing information in an acknowledgement to a transmission sent by the first other network node, and send the acknowledgement to the first and second other network nodes for use by the first and second other network nodes to save a record of the acknowledgement in respective first and second memories, to determine by a first processor of the first other network node and by a second processor of the second other network node a time for transmission of data that is unlikely to lead to a collision based on the record, to calculate a probability of collisions for the transmission of a slot available that is unlikely to lead to a collision, and to schedule their transmissions with respect to each other to reduce the probability of collisions.

12. The network node of claim 11, wherein the network node is operable to use a negative acknowledgement to resend the timing information on determination of a further collision of transmissions sent to the network node by the first and second other network nodes.

13. The network node of claim 11, wherein the timing information comprises a list of:
 transmissions sent by the first and second other nodes; the times at which the transmissions were sent by the first and second other nodes.

14. A method for reducing collisions in a wireless network, the method comprising a first network node operating in a promiscuous mode, the method comprising: receiving, at the first network node and from a second network node, an acknowledgement to a transmission sent by a third network node through the wireless network to the second network node, wherein the acknowledgement includes timing information based on a collision of transmissions sent by the network node and the second other node to the first other network node; saving, in a memory, a record of the acknowledgement of the transmission; determining, by a processor from the record, a time for transmission of data that is unlikely to lead to a collision; calculating, by the processor, a probability of collisions for the transmission of a slot available that is unlikely to lead to a collision; determining, by the processor from the record, the timing information relating to the timing of transmissions sent by the third node; and using, by the first network node, the timing information to schedule transmissions sent by the first network node to reduce the probability of collisions of with transmissions sent by the third node.

15. The method of claim 14, wherein determining the timing information comprising:
 determining a time at which the acknowledgement is received by the network node; and
 inferring the time at which the respective transmission to which the acknowledgement corresponds was sent by the other node.

16. The method of claim 14, wherein the network node is operable to determine the timing information by inspecting timing information contained in the acknowledgement.

17. The method of claim 16, wherein the timing information in the acknowledgement includes a time stamp indicating the time at which the transmission to which the acknowledgement corresponds was sent by the other node.

18. The method of claim 14, further comprising:
 determining timing information relating to the timing of transmissions sent by a plurality of other nodes; and
 using the timing information to schedule transmissions sent by the node to reduce the probability of collisions of with transmissions sent by the plurality of other nodes.

19. The method of claim 14, wherein the timing information comprises a schedule indicating the timing of a plurality of transmissions sent by the other node.

20. A method for reducing collisions in a wireless network, the method comprising a network node: determining one or more collisions of transmissions sent to the node by a first other network node and a second other network node; in response to said determination, including timing information in an acknowledgement to a transmission sent by the first other network node; and sending the acknowledgement to the first and second other network nodes for use by the first and second other network to save a record of the acknowledgement in respective first and second memories, to determine by a first processor of the first other network node and by a second processor of the second other network node a best time for transmission of data from the record, to calculate a probability of collisions for the transmission of a best slot available, and to schedule their transmissions with respect to each other to reduce the probability of collisions.

\* \* \* \* \*